US008128181B2

(12) United States Patent  
Yamauchi et al.

(10) Patent No.: US 8,128,181 B2  
(45) Date of Patent: Mar. 6, 2012

(54) BRAKING CONTROL APPARATUS

(75) Inventors: Hidehiro Yamauchi, Kariya (JP); Koichi Kokubo, Nagoya (JP); Hiroaki Niino, Toyota (JP); Takeshi Hato, Nagoya (JP); Masayoshi Takeda, Kariya (JP)

(73) Assignee: Advics Co., Ltd., Kariya, Aichi-Pref (JP)

( * ) Notice: Subject to any disclaimer, the term of this patent is extended or adjusted under 35 U.S.C. 154(b) by 456 days.

(21) Appl. No.: 12/411,832

(22) Filed: Mar. 26, 2009

(65) Prior Publication Data

US 2009/0243382 A1    Oct. 1, 2009

(30) Foreign Application Priority Data

Mar. 31, 2008  (JP) .................................. 2008-090299  
Jan. 30, 2009  (JP) .................................. 2009-020137

(51) Int. Cl.  
*B60T 8/38*    (2006.01)  
*B60T 13/18*   (2006.01)

(52) U.S. Cl. ..................... 303/119.1; 303/11; 303/116.1

(58) Field of Classification Search .................... 303/10, 303/11, 113.1, 116.1, 119.1, 155, 157, 158  
See application file for complete search history.

(56) References Cited

U.S. PATENT DOCUMENTS

| | | | |
|---|---|---|---|
| 6,409,288 B2 * | 6/2002 | Yoshida et al. | ............... 303/155 |
| 6,439,674 B1 | 8/2002 | Niino | |
| 7,699,409 B2 * | 4/2010 | Yamaguchi et al. | ....... 303/119.1 |
| 2008/0296967 A1 * | 12/2008 | Mori et al. | ..................... 303/11 |

FOREIGN PATENT DOCUMENTS

JP    2001-071755 A    3/2001

* cited by examiner

*Primary Examiner* — Thomas J Williams  
(74) *Attorney, Agent, or Firm* — Sughrue Mion, PLLC (57) ABSTRACT

A braking control apparatus includes a brake operating member, a hydraulic circuit supplying a wheel cylinder hydraulic pressure to a wheel cylinder, a pump generating a hydraulic pressure so that the wheel cylinder hydraulic pressure reaches a value in response to an operation of the brake operating member, a circulation conduit provided at a portion of the hydraulic circuit, the circulation conduit through which a partial amount of brake fluid discharged from the pump is circulated back to the pump, a pressure regulating valve adjusting a pressure difference between an upstream side of the pressure regulating valve connected to the wheel cylinder and a downstream side, and a controlling device calculating, on the basis of a circulation flow rate of the brake fluid passing through the pressure regulating valve, an applied current to the pressure regulating valve for obtaining a target of the pressure difference and controlling the applied current.

6 Claims, 7 Drawing Sheets

BRAKING CONTROL APPARATUS

CROSS REFERENCE TO RELATED APPLICATIONS

This application is based on and claims priority under 35 U.S.C. §119 to Japanese Patent Application No. 2008-90299, filed on Mar. 31, 2008, and No. 2009-020137, filed on Jan. 30, 2009, the entire contents of which are incorporated herein by reference.

FIELD OF THE INVENTION

This invention generally relates to a braking control apparatus.

BACKGROUND

A known braking control apparatus disclosed in JP2001-71755A includes a circulation conduit trough which a partial amount of brake fluid discharged from a pump is circulated back to the pump by means of rotations of a motor (i.e., by means of a motor driven to rotate). The partial amount of brake fluid discharged from the pump is circulated back to the pump without being supplied to a wheel cylinder. A pressure regulating valve is provided at the circulation conduit to adjust a pressure difference between an upstream side and a downstream side of the pressure regulating valve. Specifically, a correlation between the pressure difference and an applied current to the pressure regulating valve is provided to be used for obtaining the pressure difference on the basis of which an appropriate current is applied to the pressure regulating valve. Accordingly, the wheel cylinder pressure is controlled by the adjustment of the pressure difference.

According to the aforementioned braking control apparatus, an amount of fluid circulated back to the pump is not changed because the motor rotates at a predetermined constant speed to drive the pump. However, in a case where a rotational speed of the motor changes when driving the pump, the amount of fluid circulated back to the pump changes, which may decrease an accuracy for controlling the wheel cylinder pressure.

A need thus exists for a braking control apparatus which is not susceptible to the drawback mentioned above.

SUMMARY OF THE INVENTION

According to an aspect of the present invention, a braking control apparatus includes a brake operating member adapted to be operated by a driver, a hydraulic circuit supplying a wheel cylinder hydraulic pressure to a wheel cylinder provided at each wheel, a pump driven by rotations of a motor and generating a hydraulic pressure at the hydraulic circuit so that the wheel cylinder hydraulic pressure reaches a value in response to an operation of the brake operating member, a circulation conduit provided at a portion of the hydraulic circuit, the circulation conduit through which a partial amount of brake fluid discharged from the pump is circulated back to the pump, a pressure regulating valve adjusting a pressure difference between an upstream side of the pressure regulating valve connected to the wheel cylinder of the hydraulic circuit and a downstream side of the pressure regulating valve, and a controlling device calculating, on the basis of a circulation flow rate of the brake fluid passing through the pressure regulating valve, an applied current to the pressure regulating valve for obtaining a target of the pressure difference and controlling the applied current.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

First Embodiment

Figure 1:
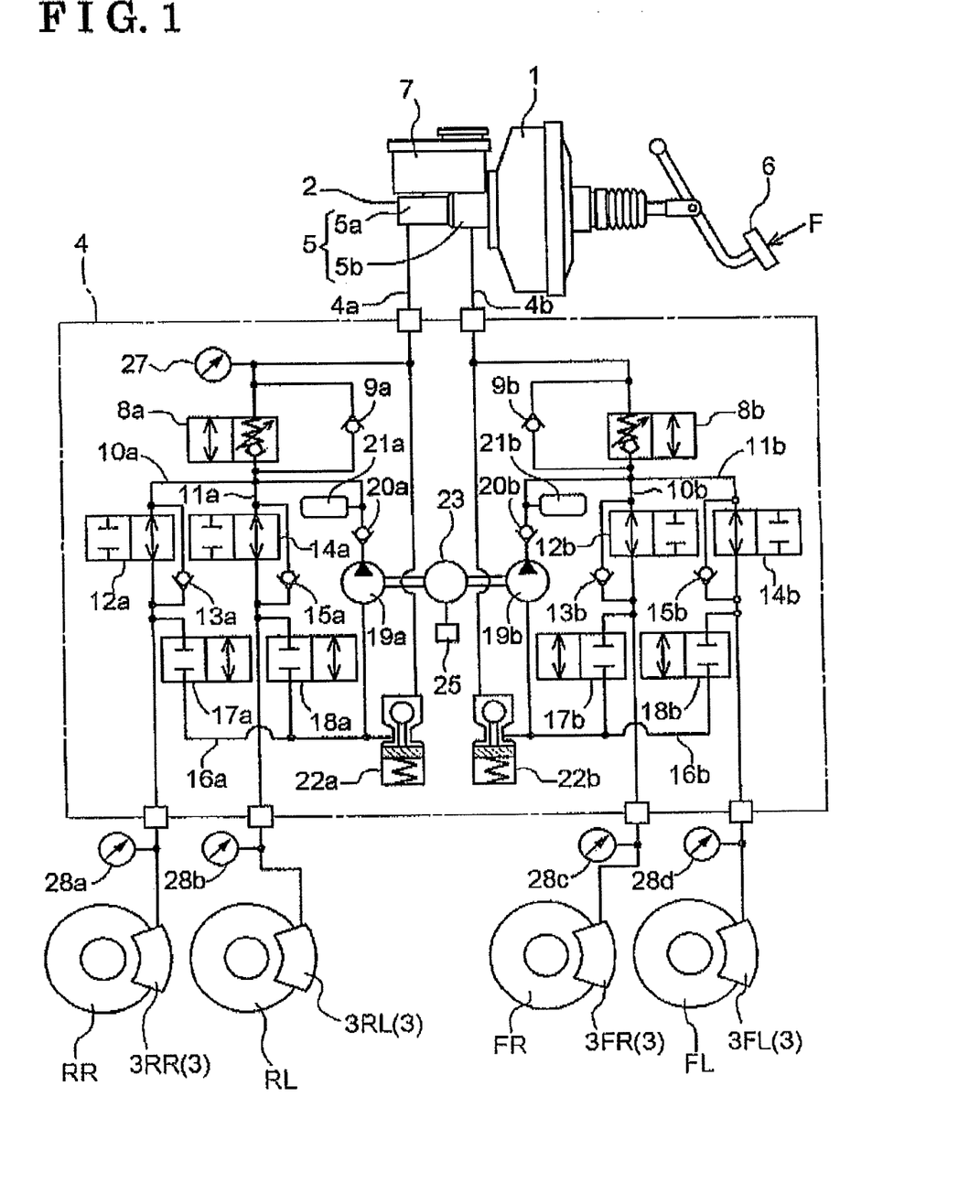
FIG. 1 is a block diagram schematically illustrating a braking control apparatus according to a first embodiment of the present invention.

A first embodiment of a braking control apparatus will be explained with reference to the attached drawings. As illustrated in FIG. 1, the braking control apparatus according to the first embodiment includes a master cylinder 2 generating a master cylinder hydraulic pressure (i.e., a master cylinder pressure) by means of an amplification of a brake operational force F, which is generated by a driver depressing a brake pedal 6 serving as a brake operating member, performed by a booster 1, and a hydraulic circuit 4 applying the master cylinder pressure to a wheel cylinder 3 at wheels. Specifically, wheel cylinders 3FR, 3FL, 3RR and 3RL are provided at four wheels, i.e., a front-right wheel FR, a front-left wheel FL, a rear-right wheel RR, and a rear-left wheel RL, respectively. The master cylinder pressure generated at the master cylinder 2 is transmitted to the wheel cylinder 3 (which comprehensively indicates the wheel cylinders 3FR, 3FL, 3RR and 3RL) via the hydraulic circuit 4.

The master cylinder 2 is a tandem cylinder constituted by two hydraulic chambers 5a and 5b (which will be collectively referred to as a hydraulic chamber 5). The master cylinder 2 generates the master cylinder pressure at each of the hydraulic chambers 5a and 5b, which are connected to a master reservoir 7. The master reservoir 7 supplies a brake fluid to the master cylinder 2 and stores an excessive brake fluid of the master cylinder 2. The booster 1 is constituted to press a piston rod of the master cylinder 2 by a force obtained through the amplification of the brake operational force.

The hydraulic circuit 4 includes a first hydraulic circuit 4a and a second hydraulic circuit 4b. The first hydraulic circuit 4a connects the first hydraulic chamber 5a to the wheel cylinders 3RR and 3RL provided at the rear-right wheel RR and the rear-left wheel RL, respectively. The second hydraulic circuit 4b connects the second hydraulic chamber 5b to the wheel cylinders 3FR and 3FL provided at the front-right wheel FR and the front-left wheel FL, respectively.

In the first hydraulic circuit 4a, a pressure regulating valve 8a is provided, being changeable between two positions, i.e., a fluid communication establishing position and a pressure regulating position. The pressure regulating valve 8a is constituted to generate a pressure difference Pd between a hydraulic pressure at a downstream side (i.e., a side facing the master cylinder 2) of the pressure regulating valve 8a (i.e., a master cylinder pressure Pm) and a hydraulic pressure at an upstream side (i.e., a side facing the wheel cylinder 3) of the pressure regulating valve 8a (i.e., a wheel cylinder pressure Pw) so that the wheel cylinder pressure Pw is higher than the master cylinder pressure Pm while the pressure regulating valve 8a is in the pressure regulating position. The pressure regulating valve 8a in the pressure regulating position changes an opening thereof in response to a current applied to the pressure regulating valve 8a so as to change a flow rate of the brake fluid passing through the pressure regulating valve 8a, thereby regulating or adjusting the pressure difference Pd.

In the first hydraulic circuit 4a, a pressure difference check valve 9a is arranged in parallel with the pressure regulating valve 8a so as to allow the brake fluid to flow towards the wheel cylinder 3 from the master cylinder 2 and to prohibit the brake fluid to flow towards the master cylinder 2 from the wheel cylinder 3. Even when the pressure regulating valve 8a is in a closed state, the pressure difference check valve 9a allows the brake fluid to flow towards the wheel cylinder 3 from the master cylinder 2 to apply the master cylinder pressure to the wheel cylinder 3.

The first hydraulic circuit 4a is split into a first split conduit 10a and a second split conduit 11a at the upstream side of the pressure regulating valve 8a facing the wheel cylinder 3. The first split conduit 10a and the second split conduit 11a are connected to the wheel cylinders 3RR and 3RL, respectively. A first normally open control valve 12a changeable between two positions, i.e., a fluid communication establishing position and a fluid communication interrupting position, is provided at the first split conduit 10a. A first check valve 13a is arranged in parallel with the first normally open control valve 12a for allowing the brake fluid to flow towards the master cylinder 2 from the wheel cylinder 3 and for prohibiting the brake fluid to flow towards the wheel cylinder 3 from the master cylinder 2. In addition, in the same way as the first split conduit 10a, a second normally open control valve 14a that corresponds to the first normally open control valve 12a at the first split conduit 10a and a second check valve 15a that corresponds to the first check valve 13a at the first split conduit 10a are provided at the second split conduit 11a.

A conduit portion split from the first split conduit 10a (i.e., first split portion) close to the wheel cylinder 3 relative to the first normal open control valve 12a and a conduit portion split from the second split conduit 11a (i.e., second split portion) close to the wheel cylinder 3 relative to the second normal open control valve 14a are merged to form a merging conduit 16a. Then, a first normally closed control valve 17a changeable between two positions, i.e., the fluid communication establishing position and the fluid communication interrupting position, is provided at the first split portion of the merging conduit 16a. In the same way, a second normally closed control valve 18a changeable between two positions, i.e., the fluid communicating position and the fluid communication interrupting position, is provided at the second split portion of the merging conduit 16a. A hydraulic pump 19a, a third check valve 20a, and a damper 21a are provided in the mentioned order at a portion of the merging conduit 16a where the first split portion and the second split portion are merged. Specifically, the hydraulic pump 19a, the third check valve 20a, and the damper 21a are connected between the pressure regulating valve 8a, and the first and second normally open control valves 12a and 14a at the first hydraulic circuit 4a. The hydraulic pump 19a is driven to rotate by a motor 23 so as to pressurize the brake fluid to a predetermined pressure level and to discharge the brake fluid. A reservoir 22a is provided between the first and second normally closed control valves 17a and 18a, and the hydraulic pump 19a at the merging conduit 16a. The reservoir 22a is connected between the master cylinder 2 and the pressure regulating valve 8a at the first hydraulic circuit 4a.

The aforementioned explanation on the structure of the first hydraulic circuit 4a of the hydraulic circuit 4 is also applied to the second hydraulic circuit 4b that has substantially the same structure as that of the first hydraulic circuit 4a. That is, the second hydraulic circuit 4b includes a pressure regulating valve 8b, a first normally open control valve 12b, a second normally open control valve 14b, a first normally closed control valve 17b, a second normally closed control valve 18b, a hydraulic pump 19b, and the like. For same members provided at the first hydraulic circuit 4a and the second hydraulic circuit 4b, "a" is affixed to each reference numeral for the first hydraulic circuit 4a while "b" is affixed to the same reference numeral for the second hydraulic circuit 4b. In the following, in the case of indicating both members provided at the first hydraulic circuit 4a and the second hydraulic circuit 4b, the reference numerals without "a" or "b" are shown.

The motor 23 is constituted to drive both the hydraulic pumps 19a and 19b provided at the first hydraulic circuit 4a and the second hydraulic circuit 4b, respectively.

Figure 2:
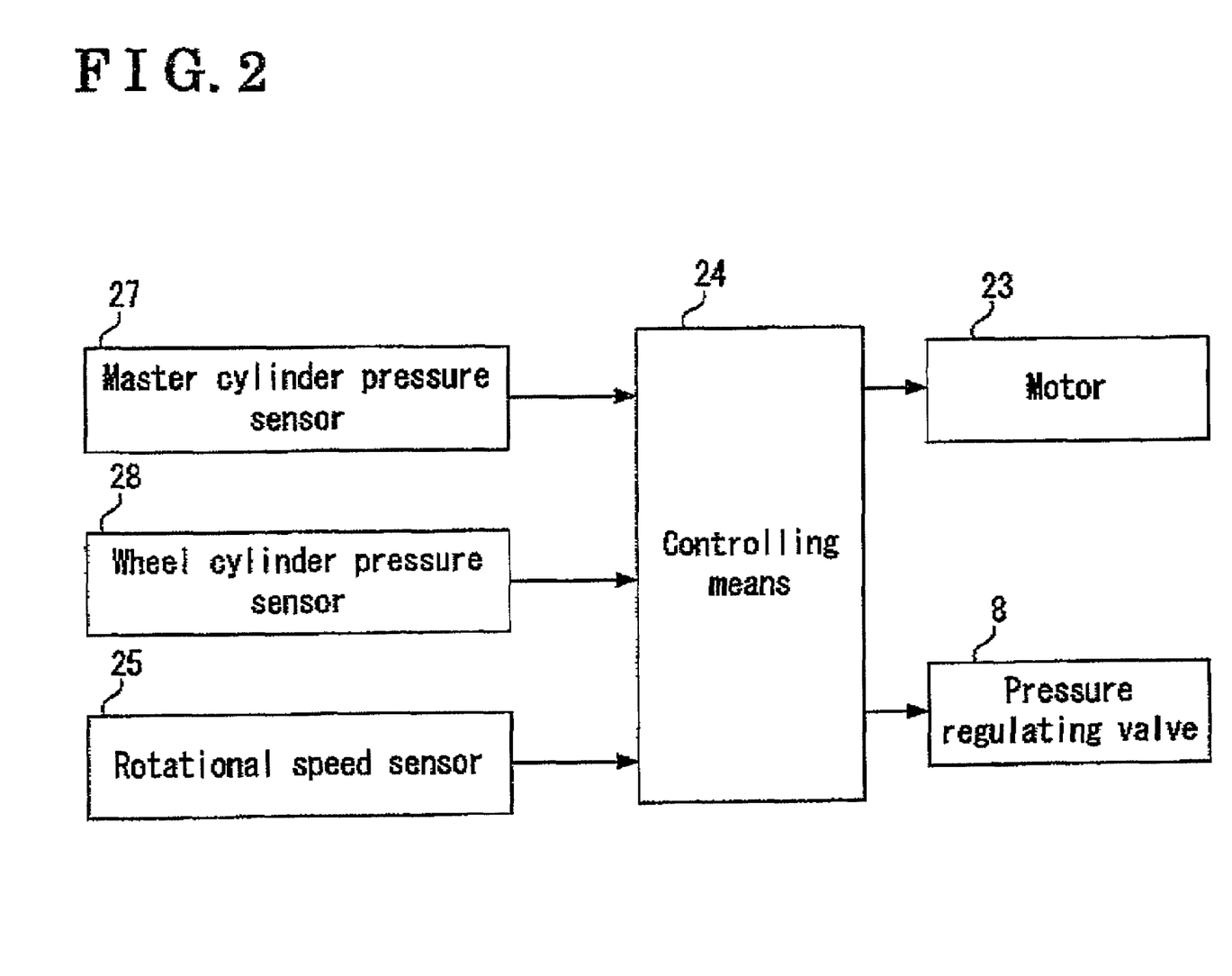
FIG. 2 is a block diagram illustrating a control logic of the braking control apparatus according to the first embodiment of the present invention.

As illustrated in FIG. 2, the braking control apparatus according to the first embodiment includes a rotational speed sensor 25 serving as a rotational speed detecting means for detecting a rotational speed of the motor 23, a master cylinder pressure sensor 27 serving as a master cylinder pressure detecting means for detecting a master cylinder hydraulic pressure (master cylinder pressure), and a wheel cylinder pressure sensor 28 serving as a wheel cylinder pressure detecting means for detecting a wheel cylinder hydraulic pressure (wheel cylinder pressure). The wheel cylinder pressure sensor 28 includes a front-right wheel cylinder pressure sensor 28c provided at the front-right wheel FR, a front-left wheel cylinder pressure sensor 28d provided at the front-left wheel FL, a rear-right wheel cylinder pressure sensor 28a provided at the rear-right wheel RR, and a rear-left wheel cylinder pressure sensor 28b provided at the rear-left wheel RL. Each of the wheel cylinder pressure sensors 28c, 28d, 28a, and 28b individually detects the hydraulic pressure at each of the wheels FR, FL, RR, and RL. According to the first embodiment, the master cylinder pressure sensor 27 is provided at the first hydraulic circuit 4a. Alternatively, the master cylinder pressure sensor 27 may be provided at the second hydraulic circuit 4b.

As illustrated in FIG. 2, a controlling means 24 is configured to receive detection signals from the rotational speed sensor 25, the master cylinder pressure sensor 27, the wheel cylinder pressure sensor 28, a wheel speed sensor for detecting a speed of the wheel, and the like. The controlling means 24 is constituted by a microcomputer including a central processing unit (CPU), a read-only memory (ROM), a random access memory (RAM), an input/output portion, and the like. The controlling means 24 controls the pressure regulating valve 8, the first normally open control valve 12, the second normally open control valve 14, the first normally closed control valve 17, the second normally closed control valve 18, and the motor 23 based on the detection signals from the rotational speed sensor 25, the master cylinder pressure sensor 27, the wheel cylinder pressure sensor 28, the wheel speed sensor, and the like, thereby controlling the wheel cylinder pressure applied to the wheel cylinder 3.

A case where the wheel cylinder pressure applied to the wheel cylinder 3RR provided at the rear-right wheel RR is controlled, for example, will be explained below. In a case of increasing the wheel cylinder pressure, the controlling means 24 controls the motor 23 to operate the hydraulic pump 19a and also controls the pressure regulating valve 8a. Further, as illustrated in FIG. 1, the controlling means 24 controls the first normally open control valve 12a in the fluid communication establishing position and the first normally closed control valve 17a in the fluid communication interrupting position. In a case of maintaining the wheel cylinder pressure, the controlling means 24 controls the first normally open control valve 12a in the fluid communication interrupting position and the first normally closed control valve 17a in the fluid communication interrupting position. In a case of decreasing the wheel cylinder pressure, the controlling means 24 controls the first normally open control valve 12a in the fluid communication interrupting position and the first normally closed control valve 17a in the fluid communication establishing position.

When the controlling means 24 controls the pressure regulating valve 8 to be switched to the pressure regulating position while the hydraulic pump 19 is being driven to rotate by means of the motor 23, the wheel cylinder pressure Pw is brought to be higher than the master cylinder pressure Pm so that an assist hydraulic pressure (assist pressure) is added to the master cylinder pressure Pm. The controlling means 24 controls a rotational speed of the hydraulic pump 19 and the opening of the pressure regulating valve 8 in the pressure regulating position. Specifically, depending on the opening of the pressure regulating valve 8, the brake fluid supplied from the hydraulic pump 19 is split, being sent to the wheel cylinder 3 through the first split conduit 10 and the second split conduit 11 and to the reservoir 22 through the pressure regulating valve 8. A flow rate of the brake fluid sent to the reservoir 22 and returned to the hydraulic pump 19 is defined as a circulation flow rate Qr. By the aforementioned splitting of the brake fluid, the pressure difference Pd between the upstream side of the pressure regulating valve 8 connected to the wheel cylinder 3 and the downstream side of the pressure regulating valve 8 connected to the master cylinder 2 is adjusted. According to the present embodiment, the pressure difference Pd is equal to the assist pressure, i.e., a difference between the wheel cylinder pressure Pw and the master cylinder pressure Pm.

Figure 3:
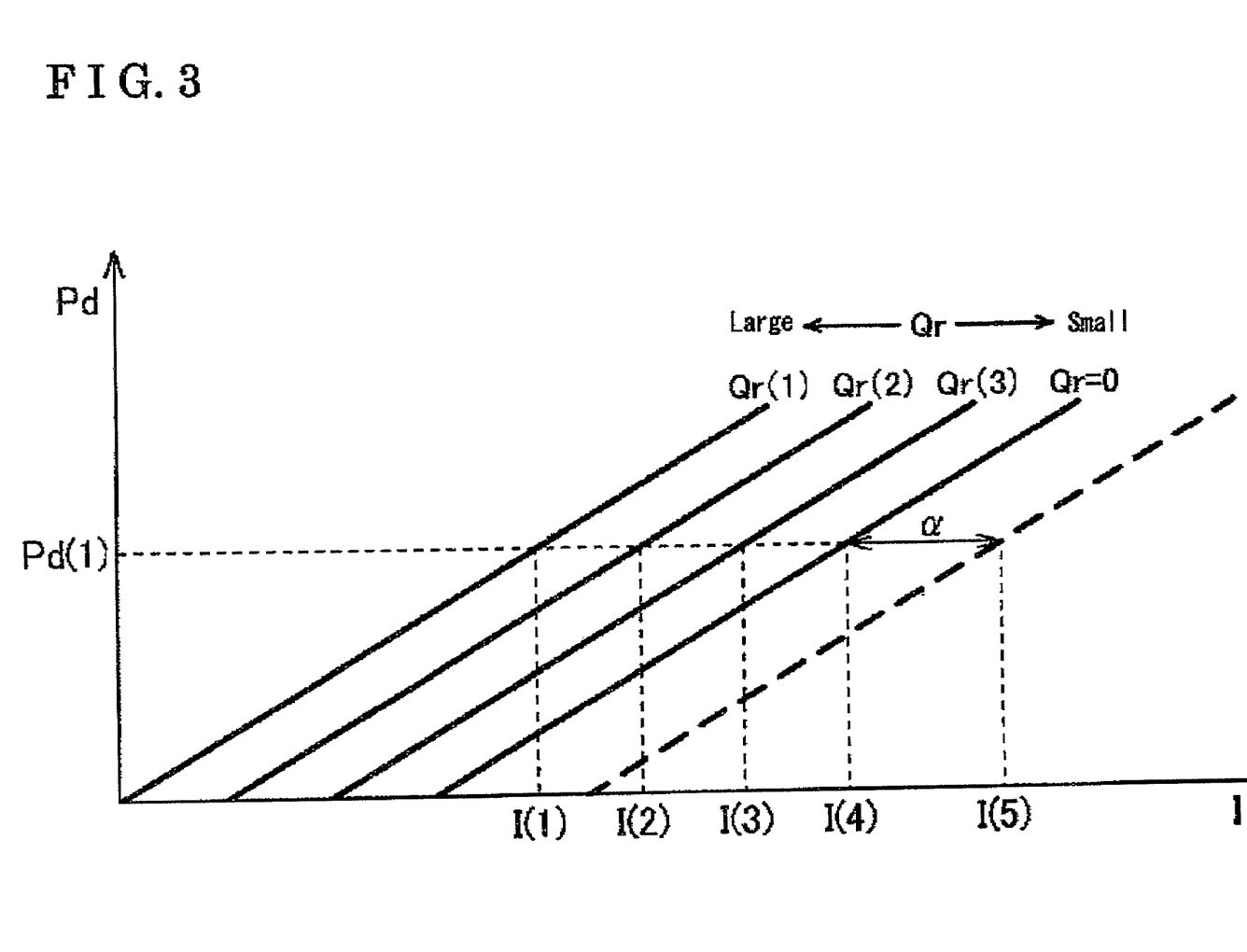
FIG. 3 is a graph illustrating a correlation between an applied current and a pressure difference at a pressure regulating valve.

FIG. 3 illustrates a correlation of the pressure difference Pd between the wheel cylinder pressure Pw and the master cylinder pressure Pm to a current applied to the pressure regulating valve 8 (i.e., an applied current I). While the applied current I to the pressure regulating valve 8 is increasing, the opening of the pressure regulating valve 8 is decreasing and the pressure difference Pd is increasing. Such correlation between the applied current I and the pressure difference Pd (i.e., I-Pd characteristics) changes depending on the circulation flow rate Qr of the brake fluid passing through the pressure regulating valve 8. Specifically, as illustrated in FIG. 3, while the circulation flow rate Qr is decreasing, a line indicating the correlation between the applied current I and the pressure difference Pd is shifted in a direction where the applied current I is increasing. The controlling means 24 selects the appropriate correlation based on the circulation flow rate Qr and then controls the applied current I and the pressure difference Pd based on the selected correlation. For example, in a case of maintaining the pressure difference Pd to a predetermined value Pd (1) while the rotational speed of the motor 23 is decreasing to thereby reduce the circulation flow rate Qr, the applied current I is increasing to values I (1), I (2), and I (3) when the circulation flow rate Qr is decreasing to values Qr (1), Qr (2), and Qr (3), thereby decreasing the opening of the pressure regulating valve 8. In a case where the motor 23 is stopped and thus the circulation flow rate Qr turns to zero, in order to maintain the pressure difference Pd at the value Pd (1), the applied current I is specified to be a value I (4) so that the pressure regulating valve 8 is completely closed. Accordingly, when the circulation flow rate Qr is large, the pressure difference Pd is easily generated and thus the opening of the pressure regulating valve 8 is controlled in an opening direction by the decrease of the applied current I. On the other hand, when the circulation flow rate Qr is small, the pressure difference Pd is difficult to be generated and thus the opening of the pressure regulating valve 8 is controlled in a closing direction by the increase of the applied current I.

In a case of bringing the circulation flow rate Qr to be zero by the stop of the motor 23, the controlling means 24 controls the pressure regulating valve 8 to completely close by further increasing the applied current I. At this time, if the pressure regulating valve 8 is not completely closed, the brake fluid at the upstream side of the pressure regulating valve 8 connected to the wheel cylinder 3 leaks and flows to the reservoir 22 from the first and second split conduits 10 and 11, which prevents an appropriate brake force. Thus, according to the present embodiment, a rightmost solid line among the lines shown in FIG. 3 is defined as the correlation between the applied current I and the pressure difference Pd when the motor 23 is stopped. For example, in a case of maintaining the pressure difference Pd at the value Pd (1), the applied current I is defined to be the value I (4). As a result, the pressure regulating valve 8 is completely closed, which leads to a zero circulation of the circulation flow rate Qr.

Figure 4:
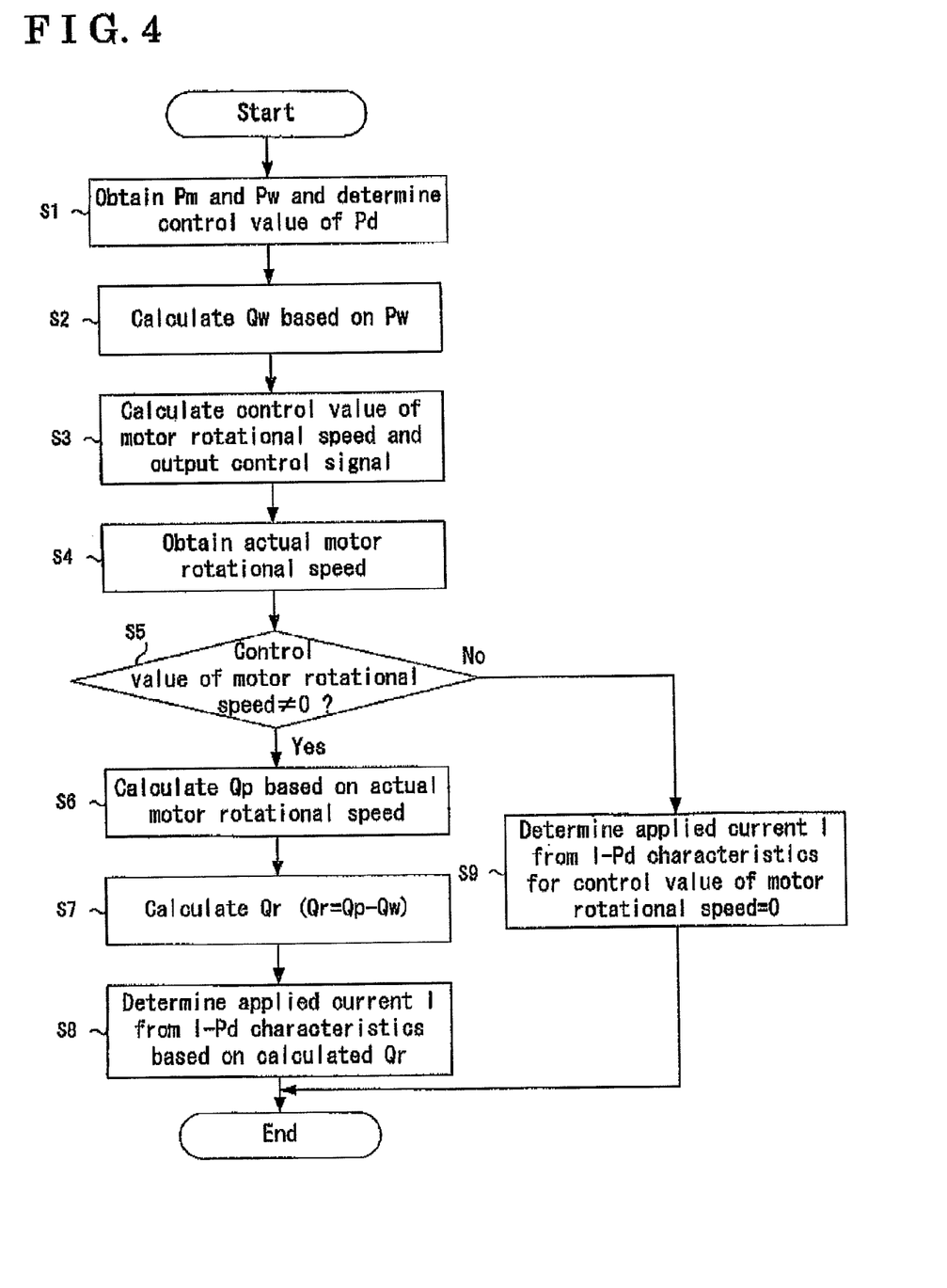
FIG. 4 is a flowchart illustrating a control of the pressure regulating valve according to the first embodiment of the present invention.

Next, a flow of a control of the pressure regulating valve 8 will be explained with reference to FIGS. 4 and 2. In step 1 (which will be hereinafter referred to as "S1" and will be also applied to subsequent steps such as "S2" and "S3"), first the controlling means 24 obtains the master cylinder pressure Pm detected by the master cylinder pressure sensor 27 and the wheel cylinder pressure Pw detected by the wheel cylinder pressure sensor 28. The controlling means 24 determines the pressure difference Pd to be generated by the target pressure regulating valve 8 based on the obtained master cylinder pressure Pm and the wheel cylinder pressure Pw. Specifically, the controlling means 24 determines a control value of the wheel cylinder pressure Pw based on the master cylinder pressure Pm, the wheel cylinder pressure Pw, a detection result of the wheel speed sensor, and the like. A difference between the control value of the wheel cylinder pressure Pw and the master cylinder pressure Pm is defined as a control value of the pressure difference Pd by the pressure regulating valve 8.

In S2, the controlling means 24 calculates a flow rate Qw of the brake fluid flowing to the wheel cylinder 3 based on the wheel cylinder pressure Pw obtained by the wheel cylinder pressure sensor 28. Specifically, the controlling means 24 calculates the flow rate Qw by differentiating a time variation of the wheel cylinder pressure Pw.

In S3, the controlling means 24 calculates a control value of the rotational speed of the motor 23 based on the master cylinder pressure Pm detected by the master cylinder pressure sensor 27, the wheel cylinder pressure Pw detected by the wheel cylinder pressure sensor 28, the control value of the wheel cylinder pressure Pw, and the like. The controlling means 24 outputs a control signal to the motor 23 so that the motor 23 rotates at the control value. In S4, the controlling means 24 obtains the actual rotational speed of the motor 23 from the rotational speed sensor 25.

In a case where the determined control value of the rotational speed of the motor 23 is not equal to zero, i.e., the motor 23 is not controlled to stop positive determination is made in S5), the controlling means 24 calculates the circulation flow rate Qr of the brake fluid passing through the pressure regulating valve 8 as follows. The controlling means 24 calculates a discharge flow rate Qp of the hydraulic pump 19 based on the rotational speed obtained by the rotational speed sensor 25 in S6. In addition, the controlling means 24 calculates the circulation flow rate Qr passing through the pressure regulating valve 8 based on the calculated flow rate Qw and the discharge flow rate Qp of the hydraulic pump 19. That is, the brake fluid discharged from the hydraulic pump 19 is partially or fully circulated through the pressure regulating valve 8, and the remaining brake fluid flows to the wheel cylinder 3. Accordingly, in S7, the circulation flow rate Qr is calculated by subtracting the flow rate Qw from the discharge flow rate Qp of the hydraulic pump 19.

The controlling means 24 determines the correlation between the applied current I and the pressure difference Pd, which is variable or different depending on the circulation flow rate Qr, on the basis of the calculated circulation flow rate Qr in FIG. 3. The controlling means 24 then determines the applied current I corresponding to the calculated pressure difference Pd in S1 according to the determined correlation so as to apply the determined applied current I to the pressure regulating valve 8 in S8.

On the other hand, in a case where the determined control value of the rotational speed of the motor 23 is equal to zero, i.e., the motor 23 is controlled to stop (negative determination is made in S5), the current applied to the pressure regulating valve 8 is determined on the basis of the correlation between the applied current I and the pressure difference Pd for the control value of the rotational speed of the motor 23 to be zero (see Qr=0 in FIG. 3) in S9.

Accordingly, the pressure difference Pd is appropriately controlled to a target value by the control of the applied current I to the pressure regulating valve 8 based on the circulation flow rate Qr even when the discharge flow rate Qp of the brake fluid from the pump 19 changes arbitrarily.

Second Embodiment

Figure 5:
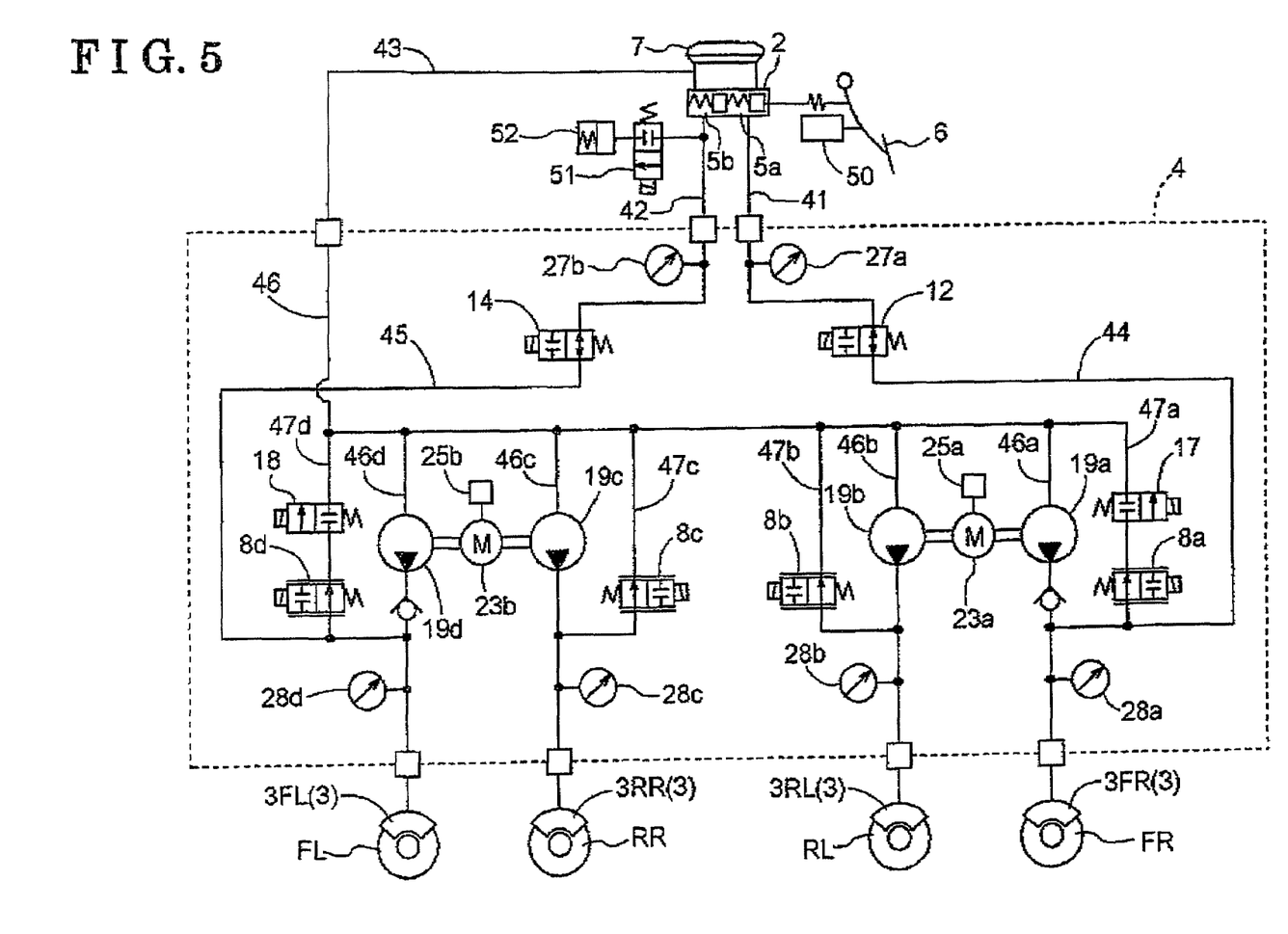
FIG. 5 is a block diagram schematically illustrating the braking control apparatus according to a second embodiment of the present invention.

A second embodiment of the braking control apparatus will be explained with reference to the attached drawings. As illustrated in FIG. 5, the braking control apparatus according to the second embodiment includes a brake pedal 6 serving as a brake operating member, a brake operation sensor 50 serving as a brake operation detecting means, a master cylinder 2, a stoke control valve 51, a stroke simulator 52, a hydraulic circuit 4, and the like.

When a driver depresses the brake pedal 6, a depressing force, i.e., a brake operation variable, of the brake pedal 6 is input to the brake operation sensor 50. Then, a detection signal in response to the operation variable detected by the brake operation sensor 50 is output therefrom to a controlling means 24, which then detects the brake operation variable. As the brake operation sensor 50, a depression sensor, a stroke sensor, or the like is applicable. In addition, the operating state of the brake pedal 6 by the driver may be detected on the basis of a detection signal of a master cylinder pressure sensor 27 serving as a master cylinder pressure detecting means which will be explained later.

Hydraulic chambers 5a and 5b of the master cylinder 2 are connected to the hydraulic circuit 4 by means of conduits 41 and 42, respectively. In addition, a master reservoir 7 is provided at the master cylinder 2 so as to supply the brake fluid thereto, store the excessive brake fluid of the master cylinder 2, and the like. A direct conduit 43 extends from the master reservoir 7 towards the hydraulic circuit 4.

The stroke simulator 52 receives therein the brake fluid within the second hydraulic chamber 5b. The stroke control valve S1 constituted by a normally closed two position valve is disposed at a conduit connecting the stroke simulator 52 and the second hydraulic chamber 5b so as to control the fluid at the conduit in the fluid communication establishing state of the fluid communication interrupting state. The stroke control valve 51 controls a flow of the brake fluid to the stroke simulator 52.

The hydraulic circuit 4 is configured as follows. First, a conduit 44 is connected to the conduit 41 so as to connect the first hydraulic chamber 5a and a wheel cylinder 3FR provided at a front-right wheel FR. A first normally open control valve 12 is provided at the conduit 44. The first normally open control valve 12 is a two-position valve that is brought in the fluid communication establishing state when the control valve 12 is not supplied with power and in the fluid communication interrupting state when the control valve 12 is supplied with power. The first normally open control valve 12 controls the conduit 44 to be in the fluid communication state or the fluid communication interrupting state.

A conduit 45 is connected to the conduit 42 so as to connect the second hydraulic chamber 5b to a wheel cylinder 3FL provided at a front-left wheel FL. A second normally open control valve 14 is provided at the conduit 45. The second normally open control valve 14 is a two-position valve that is brought in the fluid communication establishing state when the control valve 14 is not supplied with power and in the fluid communication interrupting state when the control valve 14 is supplied with power. The second normally control valve 14 controls the conduit 45 to be in the fluid communicating state or the fluid communication interrupting state.

A conduit 46 is connected to the conduit 43 formed to extend from the master reservoir 7. The conduit 46 is split into conduits 46a, 46b, 46c, and 46d. The conduit 46a is connected to the wheel cylinder 3FR while the conduit 46b is connected to a wheel cylinder 3RL. In addition, the conduit 46c is connected to a wheel cylinder 3RR while the conduit 46d is connected to the wheel cylinder 3FL.

Hydraulic pumps 19a, 19b, 19c, and 19d (which will be collectively referred to as a hydraulic pump 19) are provided at the respective conduits 46a to 46d. The hydraulic pumps 19a and 19b are driven by a motor 23a while the hydraulic pumps 19c and 19d are driven by a motor 23b. The motor 23a and 23b will be collectively referred to as a motor 23.

Circulation conduits 47a, 47b, 47c, and 47d are parallelly connected to the respective pumps 19a to 19d. The circulation conduits 47a to 47d are provided for circulating a partial amount of brake fluid discharged from the hydraulic pumps 19a to 19d to the pumps 19a to 19d, respectively.

A first normally closed control valve 17 and a pressure regulating valve 8a are provided at the circulation conduit 47a in a state where the first normally closed control valve 17 and the pressure regulating valve 8a are connected in series with each other. The first normally closed control valve 17 is arranged at an inlet port side (upstream side) of the pump 19a while the pressure regulating valve 8a is arranged at an outlet port side (downstream side) of the pump 19a. A pressure regulating valve 8b is provided at the circulation conduit 47b.

A pressure regulating valve 8c is provided at the circulation conduit 47c. A second normally closed control valve 18 and a pressure regulating valve 8d are provided at the circulation conduit 47d in a state where the second normally closed control valve 18 and the pressure regulating valve 8d are connected in series with each other. The second normally closed control valve 18 is arranged at an inlet port side (upstream side) of the pump 19d while the pressure regulating valve 8c is arranged at an outlet port side (downstream side) of the pump 19d. In the same way as the first embodiment, each of the pressure regulating valves 8a to 8d changes the opening thereof in response to the current applied thereto so as to control the brake fluid passing through the pressure regulating valves 8a to 8d, respectively. The pressure regulating valves 8a to 8d will be collectively referred to as a pressure regulating valve 8.

Wheel cylinder pressure sensors 28a, 28b, 28c, and 28d (which will be collectively referred to as a wheel cylinder pressure sensor 28 serving as a wheel cylinder pressure detecting means) are provided between the pumps 19a to 19d and the wheel cylinders 3FR, 3RL, 3RR, and 3FL at the conduits 46a to 46d, respectively, thereby detecting the wheel cylinder pressure at the wheel cylinder 3. A master cylinder pressure sensor 27a is provided at an upstream side of the first normally open control valve 12 of the conduit 44 while a master cylinder pressure sensor 27b is provided at an upstream side of the second normally open control valve 14 of the conduit 45, thereby detecting the master cylinder pressure at each of the hydraulic chambers 5a and 5b of the master cylinder 2.

Figure 6:
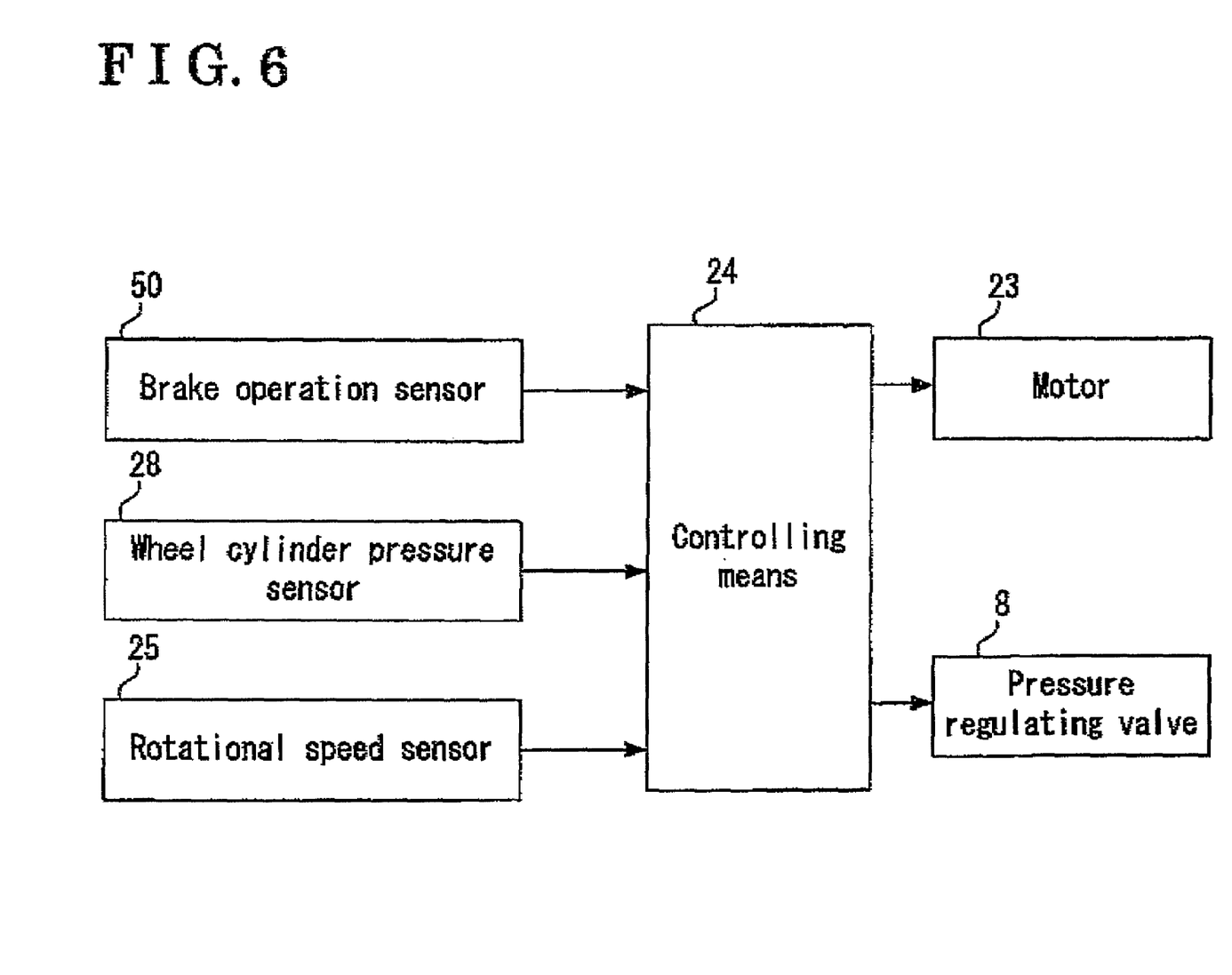
FIG. 6 is a block diagram illustrating a control logic of the braking control apparatus according to the second embodiment of the present invention.

As illustrated in FIG. 6, the controlling means 24 receives detection signals from a rotational speed sensor 25 serving as a rotational speed detecting means, the brake operation sensor 50, the wheel cylinder pressure sensor 28, and the like. The controlling means 24 controls operations of the pressure regulating valve 8, the first normally open control valve 12, the second normally open control valve 14, the first normally closed control valve 17, the second normally closed control valve 18, and the motor 23 based on the detection signals from the rotational speed sensor 25, the wheel cylinder pressure sensor 28, the brake operation sensor 50, and the like, thereby controlling the wheel cylinder pressure applied to the wheel cylinder 3.

Next, an operation of the braking control apparatus having the aforementioned structure in cases where the normal brake operation is conducted and where an error occurs in the braking control apparatus will be explained below.

[Normal Brake Operation]

In the normal braking, the first and second normally open control valves 12 and 14 are powered and the first and second normally closed control valves 17 and 18 are also powered. Thus, the first and second normally open control valves 12 and 14 are each brought to the communication interrupting state and the first and second normally closed control valves 17 and 18 are each brought to the fluid communication establishing state.

An applied current I to each of the pressure regulating valves 8a to 8d is controlled to thereby control a pressure difference Pd generated between the upstream side and the downstream side of each of the hydraulic pumps 19a to 19d by each of the pressure regulating valves 8a to 8d. In addition, the stroke control valve 51 is powered. Thus, the stroke simulator 52 is connected to the second hydraulic chamber 5b, so that the brake fluid in the second hydraulic chamber 5b moves or flows to the stroke simulator 52 when the driver depresses the brake pedal 6. As a result, when the driver depresses the brake pedal 6, a reaction force in response to the depression of the brake pedal 6 is obtained.

The controlling means 24 controls the rotational speed of each of the hydraulic pumps 19a to 19d in response to the brake operation variable of the brake pedal 6 and controls the opening of each of the pressure regulating valves 8a to 8d. Specifically, the brake fluid supplied from the hydraulic pump 19a is split, being supplied to the wheel cylinder 3FR and being circulated back to the pump 19a by passing through the pressure regulating valve 8a and flowing through the circulation conduit 47a, in response to the opening of the pressure regulating valve 8a. Because of the aforementioned splitting of the brake fluid, the pressure difference Pd between the upstream side of the pressure regulating valve 8a connected to the wheel cylinder 3 and the downstream side of the pressure regulating valve 8a is controlled. According to the present embodiment, the pressure difference Pd is equal to a wheel cylinder pressure Pw. In the same way, the pressure difference Pd for each of the pressure regulating valves 8b to 8d is adjusted.

According to the second embodiment, in the same way as the first embodiment, while a circulation flow rate Qr is decreasing, a line indicating the correlation between the applied current I and the pressure difference Pd is shifted in a direction where the applied current I is increasing as illustrated in FIG. 3. The controlling means 24 selects the appropriate correlation based on the circulation flow rate Qr and then controls the applied current I and the pressure difference Pd based on the selected correlation.

Figure 7:
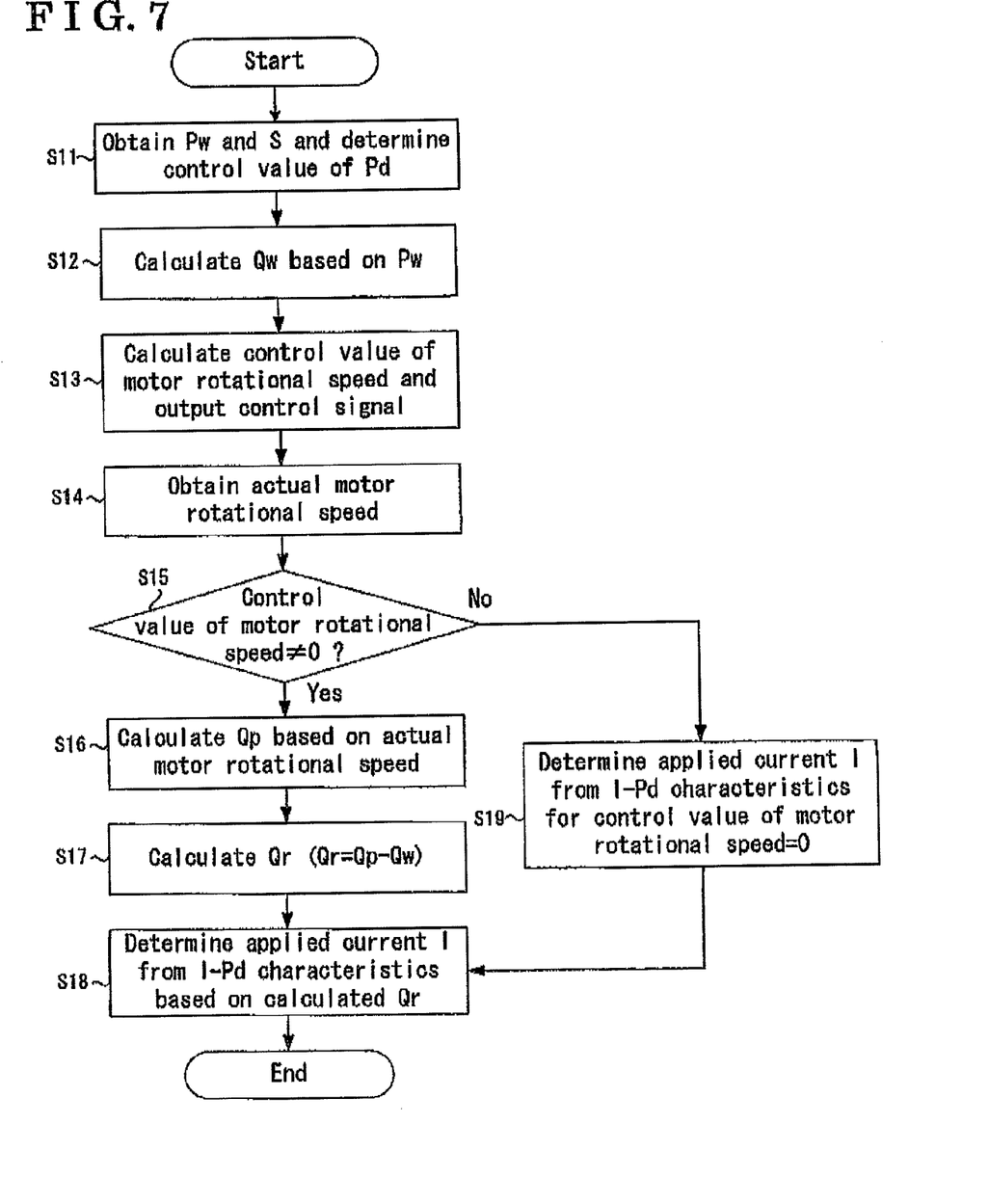
FIG. 7 is a flowchart illustrating a control of the pressure regulating valve according to the second embodiment of the present invention.

Next, a flow of a control of the pressure regulating valve 8 will be explained with reference to FIGS. 6 and 7. The control is comprehensively applicable to the pressure regulating valve 8, i.e., the pressure regulating valves 8a to 8d, and thus "a", "b", "c", and "d" affixed to each of the reference numerals will be omitted in the following explanation. In S11, the controlling means 24 obtains the wheel cylinder pressure Pw detected by the wheel cylinder pressure sensor 28 and an operation variable S detected by the brake operation sensor 50. The controlling means 24 determines a control value of the pressure difference Pd of the target pressure regulating valve 8 on the basis of the obtained operation variable S.

In S12, the controlling means 24 calculates a flow rate Qw of the brake fluid flowing to the wheel cylinder 3 based on the wheel cylinder pressure Pw obtained by the wheel cylinder pressure sensor 28.

In S13, the controlling means 24 calculates a control value of the rotational speed of the motor 23 based on the wheel cylinder pressure Pw detected by the wheel cylinder pressure sensor 28, the operation variable S detected by the brake operation sensor 50, the control value of the wheel cylinder pressure Pw, and the like. The controlling means 24 outputs a control signal to the motor 23 so that the motor 23 rotates at the control value. In S14, the controlling means 24 obtains the actual rotational speed of the motor 23 from the rotational speed sensor 25.

In a case where the determined control value of the rotational speed of the motor 23 is not equal to zero, i.e., the motor 23 is not controlled to stop (positive determination is made in S15), the controlling means 24 calculates the circulation flow rate Qr of the brake fluid passing through the pressure regulating valve 8 as follows. The controlling means 24 calculates a discharge flow rate Qp of the hydraulic pump 19 based on the rotational speed obtained by the rotational speed sensor 25 in S16. In addition, the controlling means 24 calculates the circulation flow rate Qr passing through the pressure regulating valve 8 based on the calculated flow rate Qw and the discharge flow rate Qp of the hydraulic pump 19. That is, the brake fluid discharged from the hydraulic pump 19 is partially or fully circulated through the pressure regulating valve 8, and the remaining brake fluid flows to the wheel cylinder 3. Accordingly, in S17, the circulation flow rate Qr is calculated by subtracting the flow rate Qw from the discharge flow rate Qp of the hydraulic pump 19.

The controlling means 24 determines the correlation between the applied current I and the pressure difference Pd, which is variable or different depending on the circulation flow rate Qr, on the basis of the calculated circulation flow rate Qr in FIG. 3. The controlling means 24 then determines the applied current I corresponding to the calculated pressure difference Pd in S11 according to the determined correlation so as to apply the determined applied current I to the pressure regulating valve 8 in S18.

On the other hand, in a case where the determined control value of the rotational speed of the motor 23 is equal to zero, i.e., the motor 23 is controlled to stop (negative determination is made in S5), the current applied to the pressure regulating valve 8 is determined on the basis of the correlation between the applied current I and the pressure difference Pd for the control value of the rotational speed of the motor 23 to be zero (see Qr=0 in FIG. 3) in S19.

[Abnormal Brake Operation]

At a time of an occurrence of an error in the braking control apparatus, the control signal may not be output from the controlling means 24 or various valves and the motors 23a and 23b may not be driven normally. Thus, the power supply to the various valves and the motors 23a and 23b are stopped.

That is, since the power supply to each of the first and second normally open control valves 12 and 14 is stopped, the first and second normally open control valves 12 and 14 are each brought to the fluid communication establishing state. Since the power supply to each of the first and second normally closed control valves 17 and 18 is also stopped, the first and second normally closed control valves 17 and 18 are each brought to the communication interrupting state.

In addition, the power supply to each of the pressure regulating valves 8a to 8d is stopped, thereby bringing each of the pressure regulating valves 8a to 8d in the fluid communication establishing state. The power supply to the stroke control valve 51 is stopped to thereby bring the stroke simulator 52 and the second hydraulic chamber 5b in the communication interrupting state. Further, the power supply to each of the motors 23a and 23b is stopped, so that the inlet and outlet of the brake fluid by the hydraulic pumps 19a to 19d are stopped.

In the aforementioned states the first hydraulic chamber 5a is connected to the wheel cylinder 3FR via the conduits 41 and 44. The second hydraulic chamber 5b is connected to the wheel cylinder 3FL via the conduits 42 and 45.

Therefore, when the brake pedal 6 is depressed and then the master cylinder pressure is generated at each of the hydraulic chambers 5a and 5b in response to the depression force applied to the brake pedal 6, the master cylinder pressure is transmitted to the wheel cylinders 3FL and 3FR as the wheel cylinder pressure. As a result, the braking force is generated at each of the front wheels FL and FR.

In the aforementioned embodiments, the wheel cylinder pressure sensor 28 is not necessarily provided. In such case, the circulation flow rate Qr is calculated after the master cylinder pressure and the wheel cylinder pressure are stabilized, i.e., each in a steady state, after the brake operation is conducted. That is, when the master cylinder pressure and the wheel cylinder pressure are each in the steady state, the brake fluid discharged from the hydraulic pump 19 fully passes through the pressure regulating valve 8 to be circulated back to the pump 19. Thus, the discharge flow rate Qp from the pump 19 and the circulation flow rate Qr are equal to each other. The circulation flow rate Qr is calculated by the calculation of the discharge flow rate Qp based on the rotational speed of the motor 23 accordingly.

In the aforementioned embodiments, in the case of bringing the rotational speed of the motor 23 to be zero, the applied current I and the pressure difference Pd are controlled on the basis of the correlation specified for a case where the circulation flow rate Qr is equal to zero. Alternatively, the correlation may be specified as follows for a case where the discharge flow rate of the hydraulic pump 19 is equal to zero. That is, as illustrated in FIG. 3, a correction line shown by a dashed line is specified at a side where the applied current I is greater, in addition to the four solid lines in FIG. 3. If the pressure regulating valve 8 is not tightly or completely closed in a state where the hydraulic pump 19 is stopped, the brake fluid leaks and flows from the pressure regulating valve 8. In that case, the pressure difference Pd is impossible to be maintained at the value Pd (1). In addition, because the hydraulic pump 19 is stopped, the pressure difference Pd is unable to return to the value Pd (1). In order to prevent such problem, the pressure regulating valve 8 needs to be securely held in the closed state. Therefore, in a case where the motor 23 is made stopped, the pressure regulating valve 8 is controlled in the further closing direction beyond a position where the pressure regulating valve 8 is fully closed. That is, the controlling means 24 executes a correction control so that the applied current I increases by a value a relative to a value represented by the rightmost solid line in FIG. 3. Accordingly, the pressure regulating valve 8 is securely closed. The applied current I is not necessarily corrected or amended only when the rotational speed of the motor 23 is zero. A correction level of the applied current I may be gradually increasing while the circulation flow rate Qr is gradually decreasing.

In the aforementioned embodiments, the controlling means 24 may further correct or amend the circulation flow rate Qr based on a temperature of the brake fluid (i.e., fluid temperature). The fluid temperature is measurable by various methods. For example, a temperature sensor provided at a conduit of the brake fluid at the hydraulic circuit 4 may directly detect the fluid temperature. In addition, a temperature sensor provided in the vicinity of the hydraulic circuit 4 may estimate the fluid temperature. Further, the fluid temperature may be estimated on the basis of an operation time of the pressure regulating valve 8. Furthermore, the fluid temperature may be estimated on the basis of a temperature detected or estimated by a system such as an engine system other than the hydraulic circuit 4. The circulation flow rate Qr varies depending on changes of volume or viscosity of the brake fluid caused by the fluid temperature change. Thus, the correction or amendment of the circulation flow rate Qr based on the fluid temperature detected or estimated by the aforementioned manner enables the accurate calculation of the circulation flow rate Qr.

In the aforementioned embodiments, the correlation between the pressure difference Pd and the applied current I is indicated by a straight line. Alternatively, the correlation may be indicated by a curved line, and the like that can be appropriately specified in response to characteristics of the pressure regulating valve 8.

In the aforementioned embodiments, the correlation between the pressure difference Pd and the applied current I, which is variable or different depending on the circulation flow rate Qr, is used, for example, for calculating the applied current I so as to obtain the target pressure difference Pd based on the circulation flow rate Qr of the brake fluid passing through the pressure regulating valve 8. Alternatively, a map indicating a relationship among the circulation flow rate Qr, the applied current I, and the pressure difference Pd may be provided for the determination of the applied current I based on the circulation flow rate Qr and the target pressure difference Pd.

As far as the braking control apparatus includes the master cylinder generating the master cylinder pressure based on the brake operational force, the hydraulic circuit generating the wheel cylinder pressure at each wheel based on the master cylinder pressure, and the pump driven by rotations of the motor generating the assist pressure added to the master cylinder pressure, the braking control apparatus is applicable not only to a four-wheeled vehicle but also to various apparatuses such as a two-wheeled vehicle, a rail car, and a self-propelled crane.

The braking control apparatus is applicable to a brake for an automobile and other vehicles.

When the brake fluid discharged from the hydraulic pump 19 passes through the pressure regulating valve 8, the pressure difference Pd is generated between the upstream side and the downstream side of the pressure regulating valve 8. The pressure difference Pd is not simply determined based on the opening of the pressure regulating valve 8, and is affected by a flow amount and a viscosity of the brake fluid passing through the pressure regulating valve 8, a shape of a conduit where the brake fluid flows, of the pressure regulating valve 8, and the like. It is difficult to qualitatively grasp such characteristics arising from the brake fluid serving as a fluid. Thus, according to the aforementioned embodiments, the focus is placed on the circulation flow rate Qr of the brake fluid passing through the pressure regulating valve 8 to vary when the discharge flow rate Qp of the brake fluid from the hydraulic pump 19 is changed. Then, the controlling means 24 is provided to obtain the circulation flow rate Qr of the brake fluid passing through the pressure regulating valve 8 to calculate the current value (i.e., applied current I to the pressure regulating valve 8) so as to obtain the target pressure difference Pd based on the obtained circulation flow rate Qr. As a result, even when the discharge flow rate Qp of the brake fluid from the hydraulic pump 19 varies, the circulation flow rate Qr of the brake fluid passing through the pressure regulating valve 8 becomes a parameter that most reflects characteristics of the brake fluid at that time, individual characteristics of the pressure regulating valve 8, and the like, thereby improving the accuracy for controlling the wheel cylinder pressure.

The braking control apparatus further includes the brake operation sensor 50 detecting an operation variable of the brake pedal 6, wherein the wheel cylinder pressure is generated only by the brake fluid discharged from the pump 19, the pump 19 being driven to cause the wheel cylinder pressure to reach a value in response to a detection result of the brake operation sensor 50.

According to the aforementioned embodiments, in a case where the wheel cylinder pressure is generated only by the brake fluid discharged from the hydraulic pump 19, the pressure difference Pd between the upstream side and the downstream side of the pressure regulating valve 8 turns to the wheel cylinder pressure. Thus, the appropriate control of the pressure difference Pd in the aforementioned manner may improve the accuracy of the control of the wheel cylinder pressure.

The braking control apparatus further includes the master cylinder 7 causing the master cylinder pressure to be generated at the hydraulic circuit 4 based on an operation of the brake pedal 6, and the master cylinder pressure sensor 27 detecting the master cylinder pressure, wherein the pump 19 generates an assist pressure added to the master cylinder pressure to cause the wheel cylinder pressure to reach a value in response to a detection result of the master cylinder pressure sensor 27.

According to the aforementioned embodiments, the pressure difference Pd between the upstream side and the downstream side of the pressure regulating valve 8 is equal to the assist pressure. In addition, a sum of the master cylinder pressure and the assist pressure is equal to the wheel cylinder pressure. Thus, the appropriate control of the pressure difference Pd in the aforementioned manner may improve the accuracy of the control of the wheel cylinder pressure.

The controlling means 24 determines, on the basis of the circulation flow rate Qr, one correlation between the applied current I and the pressure difference Pd, the correlation being variable depending on the circulation flow rate Qr, and the controlling means 24 controls the applied current I to the pressure regulating valve 8 based on the determined correlation.

According to the aforementioned embodiments, characteristics of an applied current relative to a pressure possessed by the pressure regulating valve 8 are acquired on the basis of the circulation flow rate Qr of the brake fluid passing through the pressure regulating valve 8. The appropriate correlation between the applied current and the pressure (i.e., between the applied current I and the pressure difference Pd) in response to the circulation flow rate Qr at the time is used for controlling the opening of the pressure regulating valve 8. That is, the circulation flow rate Qr at one instant is obtained and a current specified depending on the desired pressure difference Pd is thereafter applied to the pressure regulating valve 8. As a result the opening of the pressure regulating valve 8 is changed and then the circulation flow rate Qr is changed to thereby specify the pressure difference Pd again. Once the master cylinder pressure and the wheel cylinder pressure each turns to the steady state, the circulation flow rate Qr at that time is further obtained, and the characteristics of the applied current I relative to the pressure difference Pd possessed by the pressure regulating valve 8 are obtained for controlling the pressure difference Pd further next time. Because of the repetition of such control, the pressure regulating valve 8 is appropriately controlled, thereby achieving the braking control apparatus that exercise an excellent braking feeling.

The braking control apparatus further includes the rotational speed sensor 25 detecting a rotational speed of the motor 23, wherein the controlling means 24 calculates the circulation flow rate Qr based on the detected rotational speed in a state where the wheel cylinder pressure is stabilized after the brake operation is conducted.

In a state where the brake operation is conducted and the wheel cylinder pressure is stabilized, the brake fluid discharged from the hydraulic pump 19 is substantially fully circulated thereto again. Such circulation state is continued. Thus, while the circulation state is being continued, the discharge flow rate Qp of the brake fluid from the hydraulic pump 19 and the circulation flow rate Qr of the brake fluid passing through the pressure regulating valve 8 are substantially equal to each other. Thus, the detection of the rotational speed of the motor 23 in the aforementioned state enables the acquisition of the circulation flow rate Qr, thereby securely obtaining the characteristics of the applied current relative to the pressure possessed by the pressure regulating valve 8. As a result, the optimum braking effect is achievable.

The braking control apparatus further includes the rotational speed sensor 25 detecting a rotational speed of the motor 23 and the wheel cylinder pressure sensor 28 detecting the wheel cylinder pressure, wherein the controlling means 24 calculates the circulation flow rate Qr based on the detected rotational speed and a change level of the wheel cylinder pressure.

According to the aforementioned embodiments, the circulation flow rate Qr is calculated on the basis of the rotational speed of the motor 23 and changes of the wheel cylinder pressure. Thus, without waiting the wheel cylinder pressure to be stabilized, the circulation flow rate Qr of the brake fluid passing through the pressure regulating valve 8 is calculated. The characteristics of the applied current relative to the pressure possessed by the pressure regulating valve 8 is promptly grasped, thereby achieving the further accurate braking control.

The controlling means 24 corrects the circulation flow rate Qr based on a temperature of the brake fluid.

The circulation flow rate Qr varies depending on changes of volume or viscosity of the brake fluid caused by the fluid temperature change. Thus, according to the aforementioned embodiments, the circulation flow rate Qr is corrected or amended on the basis of the fluid temperature, thereby improving the accuracy for calculating the circulation flow rate Qr and further enhancing a quality of the braking control.

The controlling means 24 corrects the applied current I obtained on the basis of the determined correlation so that the pressure regulating valve 8 is controlled in a closing direction when the motor 23 is stopped.

In a case where the motor 23 is stopped, the supply of the brake fluid from the hydraulic pump 19 is stopped. Thus, in order to maintain the pressure difference Pd, the brake fluid from the wheel cylinder 3 needs to be prevented from leaking by passing through the pressure regulating valve 8. In addition, in a state where the supply of the brake fluid from the pump 19 is stopped, the pressure difference Pd cannot be returned once the brake fluid leaks. Therefore, according to the aforementioned embodiments, in the case where the motor 23 is stopped, the applied current I is corrected or amended so that the pressure regulating valve 8 may be controlled in the closing direction, thereby securely maintaining the closed state of the pressure regulating valve 8. Such correction or amendment of the applied current I prevents the wheel cylinder pressure from decreasing and further improves the accuracy for controlling the wheel cylinder pressure, which results in a further enhancement of the quality of the braking control.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A braking control apparatus, comprising:
   a brake operating member adapted to be operated by a driver;
   a hydraulic circuit supplying a wheel cylinder hydraulic pressure to a wheel cylinder provided at each wheel;
   a pump driven by rotations of a motor and generating a hydraulic pressure at the hydraulic circuit so that the wheel cylinder hydraulic pressure reaches a value in response to an operation of the brake operating member;
   a circulation conduit provided at a portion of the hydraulic circuit, the circulation conduit through which a partial amount of brake fluid discharged from the pump is circulated back to the pump;
   a pressure regulating valve adjusting a pressure difference between an upstream side of the pressure regulating valve connected to the wheel cylinder of the hydraulic circuit and a downstream side of the pressure regulating valve; and
   a controlling means calculating, on the basis of a circulation flow rate of the brake fluid passing through the pressure regulating valve, an applied current to the pressure regulating valve for obtaining a target of the pressure difference and controlling the applied current.

2. The braking control apparatus according to claim 1, wherein the controlling means determines, on the basis of the circulation flow rate, one correlation between the applied current and the pressure difference, the correlation being variable depending on the circulation flow rate, and the controlling means controls the applied current to the pressure regulating valve based on the determined correlation.

3. The braking control apparatus according to claim 1, further comprising a rotational speed detecting means detecting a rotational speed of the motor, wherein the controlling means calculates the circulation flow rate based on the detected rotational speed in a state where the wheel cylinder hydraulic pressure is stabilized after a brake operation is conducted.

4. The braking control apparatus according to claim 1, further comprising a rotational speed detecting means detecting a rotational speed of the motor and a wheel cylinder pressure detecting means detecting the wheel cylinder hydraulic pressure, wherein the controlling means calculates the circulation flow rate based on the detected rotational speed and a change level of the wheel cylinder hydraulic pressure.

5. The braking control apparatus according to claim 1, wherein the controlling means corrects the circulation flow rate based on a temperature of the brake fluid.

6. The braking control apparatus according to claim 1, wherein the controlling means corrects the applied current obtained on the basis of the determined correlation so that the pressure regulating valve is controlled in a closing direction when the motor is stopped.

* * * * *